Figure 1:
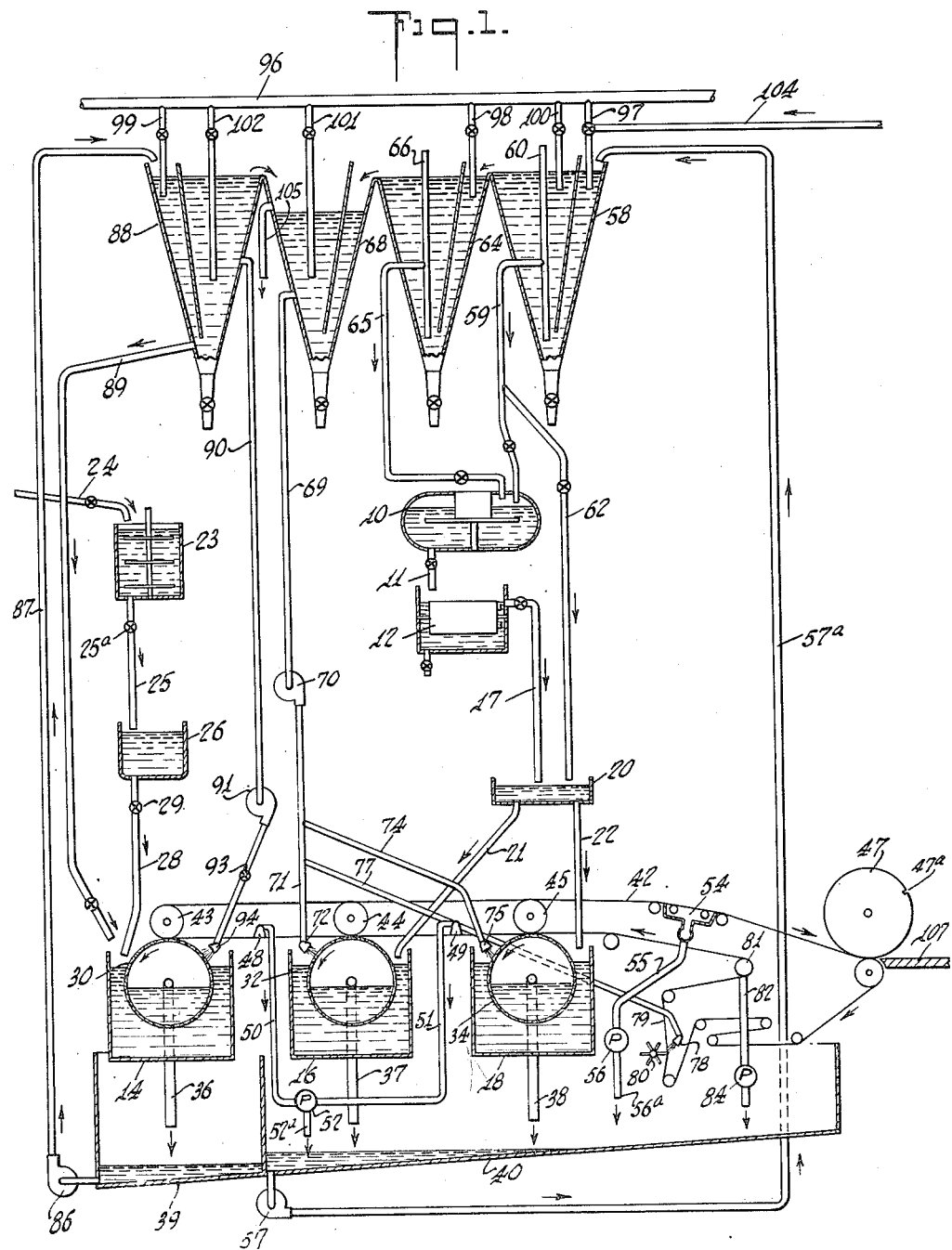

May 16, 1944.  W. GERITY  2,348,804
METHOD OF MANUFACTURING ASBESTOS-CEMENT SHINGLES OR THE LIKE
Filed April 11, 1940  2 Sheets—Sheet 1

INVENTOR
WILLIAM GERITY
BY
Samuel Stearman
ATTORNEY

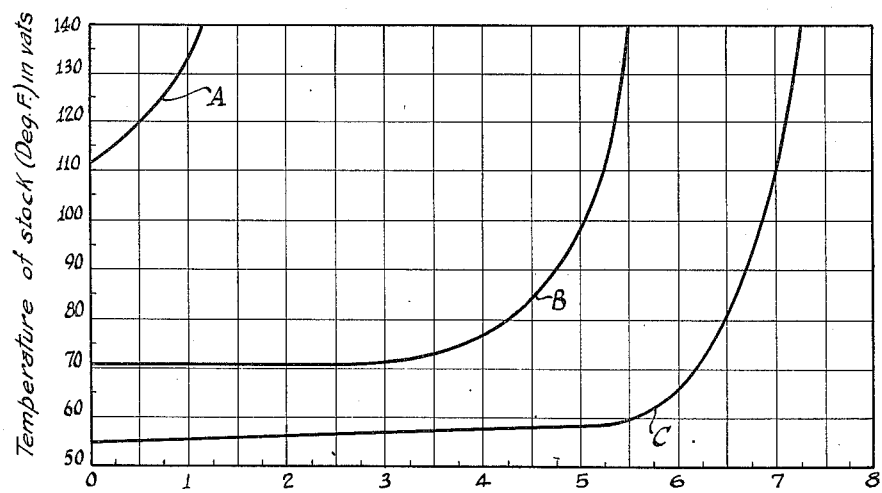

Patented May 16, 1944

2,348,804

UNITED STATES PATENT OFFICE 2,348,804

METHOD OF MANUFACTURING ASBESTOS-CEMENT SHINGLES OR THE LIKE

William Gerity, Rutherford, N. J., assignor to The Patent and Licensing Corporation, New York, N. Y., a corporation of Massachusetts Application April 11, 1940, Serial No. 329,044

11 Claims. (Cl. 92—39)

This invention relates to the manufacture of asbestos-cement products and more particularly to products of this general character adapted for use as shingles or like elements.

For many years prior to my invention, asbestos-cement sheets or slabs have been made by the so-called wet process which, though improved in certain respects during the course of the years, stems from and is predicated upon the principles of the method described in patent to Hatschek, Reissue 12,594, January 15, 1907.

Basically, the wet process involves the use of a forming machine, commonly referred to as a wet machine, for the formation of wet films of the asbestos-cement composition from a watery slurry containing suitable proportions of cement and asbestos fiber. The watery slurry is supplied to the vat or vats of a forming mold or molds in which a cylinder screen revolves and picks up a relatively thin, wet film of the solids in felted formation upon the outer surface of the screen. These films are then couched onto an endless felt blanket which conveys them to a rotating accumulator roll upon which successive laminations of the films are wound until a sufficient number thereof are obtained to produce a sheet of the desired thickness.

The sheet of material, after being built to desired thickness on the accumulator roll, is then slitted and removed therefrom in substantially flat condition and another sheet then starts to build-up on the accumulator. The sheets removed from the accumulator are then subjected to further treatment necessary to produce the finished products. These subsequent operations include usually, among others, the pressing of the sheets, or slabs into which they have been cut, in order to remove surplus water and compact each slab to the density and thickness desired in the finished product, followed by hardening and curing of the pressed slabs until they attain the required strength for shipment and use.

I have discovered that the manufacture of shingles and like products by the wet process can be greatly improved by maintaining the slurry or stock in the vats of the forming machine, at controlled elevated temperatures, as contrasted with the practice prior to my invention, wherein the temperature of the stock might vary, depending mainly upon the season of the year, from say 50° F. to say 80° F.

I have found that by maintaining the temperature of the stock at between 110 and 120° F. according to the invention, the rate of production of the shingles is greatly increased, thus reducing the amount of equipment and factory space required to manufacture a given quantity of the finished product, with resultant lowering in the cost of manufacture. Moreover, products made according to the invention are of better quality than those made by the wet process as practiced prior to my invention.

More specifically, the maintenance of the stock from which the shingles are formed at controlled elevated temperatures of the order indicated, renders the stock more flowable and thereby enables it to be picked up from the vats by the cylinder screens faster and yet more uniformly than is possible when the temperature of the stock is relatively low or normal. The blanket carrying the films couched from the cylinder screens is acted upon by vacuum or suction boxes in order to remove some of the water contained in the films and this removal of water from the films on the blanket also takes place at a faster rate when the water is at an elevated temperature, with a given vacuum, in accordance with the invention, than when the temperature thereof is normal or relatively low. This greater efficiency of water removal permits a faster rate of travel of the blanket carrying the films over the vacuum boxes and to the accumulator roll. The increase in the rate at which the stock can thus be picked up by the cylinder screens and transferred to the accumulator roll makes possible, in conjunction with other features of the invention, up to 60% faster production from the wet machine as compared to the production rate when employing water at relatively low or normal atmospheric temperatures.

Moreover, by operating according to the invention, the plies or laminations transferred to the accumulator roll are relatively drier and less sticky than is otherwise the case, and consequently, when the desired number of laminations have been wound on the accumulator, the stripping of the resultant sheet therefrom can be accomplished much easier and faster, and with fewer damaged sheets and less frequent stoppage of the machine to scrape off broken pieces from the accumulator roll. Further, the moist, plastic sheets removed from the accumulator roll when operating in accordance with the invention are stronger due to the removal of more water from the plies by the action of the vacuum or suction boxes and consequently these sheets can be handled faster, easier and with less tearing or other damage to the sheets. Since sheets torn at this stage are returned to the system to be reworked, fewer torn or damaged sheets further contributes to the greater efficiency and lowering in cost of operation.

In the manufacture of shingles, the relatively large sheets removed from the accumulator are cut into smaller units approximating the size of the shingles or other products being manufactured, and the units are then arranged in piles, with divider plates between adjacent units, for pressing them in order to compact the units to the desired density and thickness. Before being pressed, however, the units must be aged until they have hardened to a sufficient degree to withstand the pressing action and to permit, after the pressing has been done, immediate removal of the divider plates from the surfaces of the units without sticking of the units to the divider plates. In usual practice, prior to my invention, it required from three to as much as eight hours for properly aging the wet units before they could be pressed without substantial danger of injury during the pressing operation or by removal of the divider plates immediately after pressing. It is an important feature of the invention that by the use of the controlled elevated temperatures in the operation of the wet machine, an aging period of not more than about one and a half hours is adequate to permit of pressing the units arranged in stacks or piles thereof and removing the divider plates immediately after the pressing. This reduction in the time required for proper aging of the units before pressing is undoubtedly due to the fact that the use of the elevated temperatures in the wet machine operation greatly accelerates the rate of hydration of the cement, thus bringing about a more rapid hardening of the sheets than is otherwise the case. And, as a result of the reduction in the time required for aging of the units before they are pressed, less space and equipment are required to store and handle them during this aging period.

The units after being pressed are at a temperature favorable to rapid hydration of the cement and consequently hydration of the cement proceeds at a rapid rate so that the curing of the cement is very greatly accelerated. By surrounding the pressed units, preferably arranged in piles, with a warm, moisture laden, atmosphere, the rapid curing rate can be maintained even though the temperature does not substantially exceed 175° F. After exposure to these curing conditions for approximately sixteen hours, the units may then be cut or trimmed to final size while still hot and be easily surface dried by virtue of their latent heat, whereupon they may be packaged in bundles for shipment.

An important feature of the invention resides in the means employed for adapting it to use in the operation of the wet machine conducted as a closed system.

Other features and advantages will appear from a consideration of the more detailed description which is to follow and from the accompanying drawings in which Fig. 1 is a diagrammatic illustration of apparatus arranged for carrying out the invention, and Fig. 2 is a graph illustrating the effect of the controlled elevated temperatures, employed in carrying out the invention, in accelerating the aging and curing of the product.

Referring in detail to Fig. 1, the numeral 10 indicates a beater or mixer which may be of any well known form, wherein suitably proportioned quantities of asbestos fiber and cement (delivered thereto by suitable feed devices from hoppers, not shown) are mixed with water to form a slurry thereof. The water for forming the slurry is furnished to the beater as hereinafter explained. The cement and asbestos fiber may be in the proportions of 15 to 30% of asbestos and 70 to 85% of cement. Material withdrawn from the beater as through a pipe 11 is delivered to a storage chest 12 for maintaining a supply of the slurry to be delivered to the wet machine where the stock is formed into sheets. The wet machine proper comprises a series of vats, three being illustrated at 14, 16 and 18. The slurry from the stuff chest 12 may be delivered through pipe 17 to a supply trough 20 from which it is fed to the vats 16 and 18 as through pipes 21, 22. The stock for the vat 14 is prepared separately from that to be supplied to vats 16 and 18, the vat 14 being generally employed only when the surface of the products to be made are provided with a veneer or surface layer of predetermined color differing from the color of the stock supplied to the other two vats. In this instance, the ingredients of the stock, including the required proportions of cement, asbestos fiber and coloring agent to be supplied to the vat 14, are delivered to and mixed in a mixer 23, water being supplied to this mixer as from a pipe 24. The stock is delivered from the mixer through a discharge pipe 25, under control of a valve 25a, to a supply reservoir 26, discharging directly to the vat 14 through the feed line 28 under control of the valve 29. Within the vats 14, 16 and 18 are rotating cylindrical screens 30, 32, 34 upon the exterior surfaces of which a layer of the stock from the respective vats is formed when the cylinders are rotated, the level of the stock in the vats being above the level of the effluent in the interior of the cylinders. The effluent from the cylinder 30 overflows through a pipe 36 into a pit or sump tank 39 and the effluent from the cylinders 32 and 34 overflows through pipes 37, 38 into a pit or sump tank 40.

The material picked up as a wet film on the surfaces of the cylinders during the rotation thereof is couched onto an endless blanket 42 by the action of couch rolls 43, 44, 45 and the films thus transferred to the blanket are conveyed by the latter to a steel surface accumulator drum 47 where they are wound in successive convolutions until a sufficient number of plies or laminations have been built up thereon to provide the desired or required thickness. In accordance with usual practice, where the product being made is to have a surface layer or veneer of predetermined color, the cylinder 30 will be active to deposit a film of material from vat 14 simultaneously with the deposition of films by the cylinders 32 and 34 only at the beginning of each cycle of operation for building up a sheet of the required thickness on the accumulator roll and for a length of time sufficient to furnish the first lamination immediately against the face of the accumulator roll, whereupon the cylinder 30 is rendered inactive for the balance of the cycle, during which only the cylinders 32 and 34 furnish the laminations to build up the required thickness.

A certain amount of water from the wet plies carried by the blanket to the accumulator roll 47 is abstracted by vacuum boxes at 48 and 49 connected by pipes 50, 51 respectively, to a vacuum pump 52, and by a vacuum box 54 acting upon the underside of the upper run of the blanket, this vacuum box being connected by a pipe 55 to a vacuum pump 56. The pumps 52, 56 discharge through pipes 52ᵃ, 56ᵃ, respectively to the sump tank 40.

The effluent material from the cylinders 30, 32, 34 and the water sucked out of the wet plies at the vacuum boxes usually contains from 0.5 to 2% solids, comprising cement fines and very short asbestos fibers, suspended therein.

My invention more particularly contemplates the operation of the wet machine in a so-called closed system, wherein these suspended solids are segregated as by concentration in settling tanks and returned, as is the clarified water, for use in the system, only such additional quantities of fresh water being supplied to the system as is necessary to replace that which is carried out of the system with the sheets delivered from the wet machine, or which is lost by evaporation etc.

As shown, the bottom of the sump tank 40 is inclined so that the liquid material therein will flow to a pump 57 by which it is delivered as through a pipe 57ˣ to a settling cone 58 of well-known construction. The concentrated or thickened suspension containing usually 3 to 5% solids is withdrawn through the pipe 59 by the siphoning action of the stand pipe 60 and may be continuously fed, as through the pipe 62, to the supply trough 20. The underflow or thickened material withdrawn from this cone also serves as a supply of water to the beater 10, intermittently, with each fresh charging of asbestos fiber and cement to the beater. The overflow of substantially clarified water from the settling cone 58 discharges to a second settling cone 64. The thickened suspension or underflow from the second cone is also conveyed to the beater 10 through pipe 65, connected to the stand pipe 66, when the beater is charged with a fresh supply of cement and asbestos fiber. The overflow from the settling cone 64 discharges to a third cone 68 and since this overflow is substantially free of any suspended solids, the cone 68 may be considered to serve merely as a storage reservoir for the clarified water. This clarified water is employed as a shower or spray for the cylinders 32 and 34 to clean the openings therein after the film formed during the rotation thereof has been couched onto the blanket 42. Thus, the water from the cone 68 feeds through the pipe 69 to the pump 70 by which it is delivered through the pipe 71 to a spray 72 adjacent the surface of the cylinder 32 and through a branch line 74 to a spray 75 adjacent the surface of the cylinder 34. Some of the water delivered by the pump 70 is also fed through the pipe 77 to a showering spray 78 located on the inner side of the blanket 42 along the vertically running stretch 79 of its return from the accumulator roll to the forming cylinders. As the inner face of the blanket is showered with water from spray 78, the outer face of the blanket is whipped as by a whipper device 80. Thus, the blanket is efficiently cleansed of solids that may be retained in the pores thereof. The shower water may then be largely sucked out of the blanket by a vacuum roll 81 around which the blanket travels, the roll 81 being connected by pipe 82 to a vacuum pump 84 discharging into the sump tank 49.

The effluent from the cylinder 30 collected in the sump tank 39 may be delivered by pump 86 through a pipe 87 to a settling cone 88 from which the concentrated suspension of solids is delivered through the pipe 89 for return to the vat 14. The supernatant clarified water from the settling cone 88 is delivered through the pipe 90 by the pump 91 to a showering spray 94 acting against the cylinder 30. Overflow from the cone 88 discharges into the cone 68. The spray 94 serves to wash the material picked up by cylinder 30 during that portion of each cycle for building up a sheet of the required thickness on the accumulator roll, when it is desired not to deposit material from the vat 14. Thus, at the beginning of each such cycle, the flow of material through the feed pipe 90 is interrupted by closing the valve 93 so that during the interval of time when no water is fed through the spray 94, the deposit picked up by the cylinder 30 will be couched onto the blanket 42 for transfer to the accumulator roll. This interval is of such duration as to permit the transfer of a film from cylinder 30 extending over a length of the blanket corresponding substantially to the circumference of the accumulator roll, whereupon the opening of valve 93 will prevent transfer of material picked up by cylinder 30 during the balance of the cycle.

Although any means may be employed to maintain the stock in the vats 14, 16, 18 at the controlled elevated temperatures herein referred to, I have found that these temperatures may be most conveniently maintained and numerous other advantages secured by feeding steam into the system through the settling cones. Thus, as shown in Fig. 1, a main steam line 96 is connected by a branch line 97 leading to the inlet side of the settling cone 58. Similarly, a branch line 98 from the main 96 feeds steam to the inlet side of the settling cone 64 and a line 99 feeds steam to the inlet side of the settling cone 88. Lines 100, 101, 102 connected to the main 96 may also be provided to extend into the discharge side of the settling cones 58, 68, 88 respectively. In actual operation, steam may be fed from anyone or all of the lines 97 to 102 inclusive at the start of the operation in order to provide a quick initial warming up of the system, after which it is necessary only to feed steam through the lines 97 and 99 in order to maintain the controlled temperature conditions in the system during continued operation. Water required to provide the desired consistency of the stock for vats 16 and 18 may be supplied through the feed pipe 104, which preferably is connected directly to the steam line 97. Excess water that may accumulate in the cone 68 overflows through pipe 105.

By thus introducing steam into the system in the manner described, the temperature of the stock in the forming vats and of the system as a whole may be maintained at between 110 and 120° F. At the elevated temperature which thus prevails in the beater 10 and in the chest 12 and supply trough 20, the cement is more quickly wetted and the asbestos fiber more quickly hydrated than at normal relatively low temperatures. The stock not only felts easier, more uniformly, and faster on the cylinder screens, permitting faster rotation of the screens, but water is more quickly withdrawn from the deposited films on the blanket by the action of the suction boxes 48, 49 and 54, permitting a corresponding increase in the speed of the blanket. Since the films or laminations contain less water when they reach the accumulator roll than is the case where the stock in the vats is at normal atmospheric temperatures or therebelow, the sheets are drier and less sticky and hence stronger and more easily removable from the accumulator, with less danger of injury to the sheets. The solids in the effluent from the screens and vacuum boxes settle at a faster rate at elevated temperatures than when cold water or water at atmospheric temperature is used, this accelerated settling of the solids permitting an earlier return of the suspended solids to the wet machine. In addition, the clarified water from settling cones is actually cleaner and more free from unsettled solids, and is thus more efficient as a shower for the cylinder screens and in cleaning the banket, not only because it is cleaner but also by reason of its elevated temperature. And so long as the temperature of the clarified water is not too high, the use of the elevated temperatures results in less shrinkage and less danger of destruction of the wool content of the blankets than where the water is relatively cold.

The sheets as built up on the accumulator roll 47 may be removed therefrom as by slitting through a depression 47a extending lengthwise along the surface of the roll and the sheets thus removed are delivered to a receiving table 107. Since the area of the accumulator roll surface is usually several times that of commercial forms of shingles, the sheets delivered to the receiving table are cut into units of a size approximating that of the finished products. At this stage, the units contain about 22 to 25% water and are still relatively soft and plastic and considerably thicker than the thickness of the finished products. For the production of commercial forms of shingles, therefore, it is necessary to subject the units to a pressing operation in order to compact them to the desired density and thickness. For that purpose the units are assembled in piles with metal or other suitable divider plates inserted between the adjacent units of each pile or stack. The divider plates may be either smooth surfaced, or where it is desired that one surface of the finished product be provided with a rough or textured surface, as one simulating wood grain, the divider plates, or alternate ones thereof used in the stack, are correspondingly embossed on one or both surfaces thereof. Before so assembling the units in piles or stacks and pressing them, they must be allowed to age so that they will be hard enough to withstand the pressing action and permit removal of the divider plates from the surfaces of the pressed units, immediately or reasonably promptly after the pressing operation, without sticking of the units to the plates or causing delamination or disfigurement of the units, as frequently occurs when the plates are separated from the pile after pressing units that have not been adequately aged before the pressing.

When operating in accordance with the invention, an aging period of one to one and a half hours is generally sufficient to harden the shingles so that they can be pressed in the manner described and so that the divider plates can be removed from the pile or stack immediately after the pressing operation.

The reason for this more rapid aging of the units cut from the wet sheets will be evident from a consideration of Fig. 2 hereof. As will be noted from curve A there shown, the temperature of the wet sheets when formed from the slurry or stock maintained at a temperature of approximately 110° F. increases to a temperature of 140° F. within about one and a quarter hours, thus bringing about earlier hydration and initial hardening of the cement than is the case where the slurry or stock from which the sheets are formed is at substantially lower temperatures. Thus, where this stock is at a temperature of approximately 70° F., the time required for the sheets to attain temperatures of 140° F., as indicated by curve B of Fig. 2, is of the order of five and a half hours and it would not be safe, therefore, to press the units in that instance prior to the lapse of about four hours of that interval, if the divider plates are to be removed immediately or shortly after pressing. Similarly, as shown by curve C of Fig. 2, where the temperature of the stock from which the sheets are formed is as low as 55° F., the sheets will not attain a temperature of 140° F. until after about seven hours and it would not be safe in this case to press the shingles prior to the lapse of approximately six to six and a half hours of this interval, if the divider plates are to be removed immediately or shortly after pressing.

The pressing operation may be conducted in any suitable hydraulic press adapted to exert a pressure of the order of 3000 to 5000 pounds, or thereabouts, per square inch. By this pressing action, the units are densified and reduced in thickness to approximately four-fifths their original thickness, a substantial amount of the water being expressed therefrom during the pressing action. Generally where the moisture content of the units before being pressed is about 22 to 25% (calculated on their wet weight), pressures of the order of 3500 pounds per square inch reduces the moisture content to about 17 to 18% (calculated on the wet weight of the pressed material), this amount being sufficient to supply the water necessary to complete the hydration of the cement component and still leave about 10% as normal moisture content in the finished product.

After the units have been pressed and the divider plates removed from the piles as above described, they may be piled in stacks in a closed room or chamber wherein the units are subjected to a warm, moisture laden atmosphere, as by introducing or bleeding live steam from small jets into the room or chamber. In this manner, rapid curing of the units can be achieved even though the temperature does not substantially exceed 175° F. After exposure to these curing conditions for approximately sixteen hours, the units may then be cut or trimmed to final size while still hot and be easily surface dried by virtue of their latent heat, whereupon they may be packaged in bundles for shipment. The finished products made in the manner described and using a pressure of the order of 3500 pounds per square inch during the pressing operation, have a strength represented by a modulus of rupture of from 3000 to 3500 pounds per square inch within twenty-four hours. With pressing pressures of the order of 5500 pounds per square inch, the modulus of rupture is about 6000 pounds per square inch within twenty-four hours. Moreover, after being dried and before they are packaged, products made by my invention contain only about 10% of free moisture and are, therefore, less subject to the occurrence of efflorescence due to carbon dioxide absorption than is the case with shingles made by the wet process as practiced prior to my invention and cured at low temperatures, since such shingles usually contain as much as 15% of free moisture. Products made and cured according to the invention are also more uniform in color and free from objectionable white or light colored edges which frequently otherwise result.

Thus, it will be seen that by my invention, uniform and more rapid production rates can be maintained throughout the year, avoiding difficulties caused by seasonal changes in the weather or the use of water at relatively low temperatures in the operation of the wet machine. By my invention, it becomes possible to produce finished shingles or similar products of improved quality, packaged and ready for shipment within the space of eighteen to twenty hours from the time the cement and asbestos fiber are first mixed together as raw materials. The operation is not only faster and less costly because of the smaller amount of equipment and space required for the production of a given quantity of finished product as well as for storage and handling of materials in process and finished products, with resultant additional lowering in the labor cost to produce a given volume of finished product, but is also smoother from beginning to end, resulting in a lower percentage of rejects because of failure of the product to meet the required standards of strength and appearance.

While the invention has been described with particular reference to the manufacture of shingles, it will be understood that operation of the wet machine according to the invention will afford generally similar benefits and advantages when utilized for the manufacture of other asbestos-cement products.

I claim:

1. In the manufacture of asbestos-cement products from a wet slurry of cement and asbestos fiber, the steps which comprise maintaining said slurry at a temperature of 110 to 120° F., forming wet plies from said slurry by dewatering the same, and building up a sheet by laminating a predetermined number of said plies while wet.

2. In the manufacture of asbestor-cement shingles from a wet slurry of cement and asbestos fiber, the steps which comprise maintaining said slurry at a temperature of 110 to 120° F., forming wet plies from said slurry by dewatering the same, building up a sheet by laminating a predetermined number of said plies while wet, cutting said sheet into units and subjecting a plurality of said units, while arranged in a pile, to pressure whereby to compact the individual units to the required density and thickness.

3. In the manufacture of asbestos-cement shingles from a wet slurry of cement and asbestos fiber, the steps which comprise maintaining said slurry at a temperature of 110 to 120° F., forming wet plies from said slurry by dewatering the same, building up a sheet by laminating a predetermined number of said plies while wet, cutting said sheet into units, allowing the wet units to set for a period of one to two hours, collecting a plurality of such units in a pile with divider plates between the individual units of the pile, and subjecting the pile of said units, to pressure of the order of 3000 to 6000 pounds per square inch, and removing the divider plates from the pile substantially immediately after pressing.

4. In the manufacture of asbestos-cement products from a wet slurry of cement and asbestos fiber, the steps which comprise maintaining said slurry at a temperature of 110 to 120° F., forming wet plies from said slurry by dewatering the same, building up a sheet by laminating a predetermined number of said plies while wet, treating the effluent from said dewatering step while maintaining the same at a temperature of about 110° F. to effect settling of the solids as a thickened suspension, and utilizing the thickened suspension of solids in making up fresh quantities of the slurry.

5. In the manufacture of asbestos-cement shingles from a wet slurry of cement and asbestos fiber, the steps which comprise maintaining said slurry at a temperature of 110 to 120° F., forming wet plies from said slurry by dewatering the same, building up a sheet by laminating a predetermined number of said plies while wet, treating the effluent from said dewatering step while maintaining the same at a temperature of about 110° F. to effect settling of the solids as a thickened suspension, utilizing the thickened suspension of solids in making up fresh quantities of the slurry, cutting units from the built-up sheet, and subjecting a plurality of said units to densifying pressure while arranged in a pile.

6. In the manufacture of asbestos-cement shingles from a wet slurry of cement and asbestos fiber, the steps which comprise maintaining said slurry at a temperature of 110 to 120° F., forming wet plies from said slurry by dewatering the same through screen openings, building up a sheet by laminating a predetermined number of said plies while wet, treating the effluent from said dewatering step while maintaining the same at a temperature of about 110° F. to effect separation of the same into clarified water and a thickened suspension of the solids contained therein, utilizing the thickened suspension of solids in making up fresh quantities of the slurry, cutting units from the built-up sheet, cutting said sheet into units, subjecting a plurality of said units to densifying pressure while arranged in a pile, and utilizing the clarified water to keep said screen openings clear.

7. In the process of making asbestos-cement products from a slurry of asbestos fiber and cement, the steps which comprise forming wet plies from said slurry by dewatering the same, building up a sheet by laminating a predetermined number of said plies while wet, collecting the effluent from the dewatering of the slurry, segregating the effluent into clarified water and a thickened suspension of the solids contained in the effluent, maintaining the temperature of said slurry and of the effluent undergoing segregation at approximately 110 to 120° F., and mixing the segregated suspension with fresh quantities of asbestos fiber and cement to form additional quantities of slurry.

8. In the process of making asbestos-cement products from a slurry of asbestos fiber and cement, the steps which comprise forming wet plies from said slurry by dewatering the same, building up a sheet by laminating a predetermined number of said plies while wet, collecting the effluent from the dewatering of the slurry, segregating the effluent into clarified water and a thickened suspension of the solids contained in the effluent, maintaining the temperature of said slurry at approximately 110 to 120° F., maintaining the temperature of the thickened suspension at approximately 110 to 120° F., mixing portions of the same with previously prepared slurry and mixing other portions thereof with fresh quantities of asbestos fiber and cement to form additional quantities of slurry.

9. In the process of making asbestos-cement shingles by dewatering a slurry of asbestos fiber and cement, the steps which comprise collecting the effluent from the dewatering of the slurry, segregating the effluent into clarified water and a thickened suspension of the solids contained in the effluent, maintaining the temperature of said slurry at approximately 110 to 120° F., maintaining the temperature of the thickened suspension at approximately 110 to 120° F., mixing portions of the same with previously prepared slurry and mixing other portions thereof with fresh quantities of asbestos fiber and cement to form additional quantities of slurry, maintaining the temperature of the clarified water at approximately 110 to 120° F., and utilizing the same as a shower for keeping the dewatering means clear.

10. In the manufacture of asbestos-cement products by dewatering a slurry of cement and asbestos fiber, the steps which comprise collecting the effluent from the dewatering of the slurry, recovering a thickened suspension of the solids therefrom, heating the effluent while undergoing said recovery, mixing said suspension with fresh quantities of cement and asbestos fiber whereby to form additional quantities of slurry and impart thereto a temperature of 110 to 120° F., forming wet plies by dewatering said slurry while the latter is maintained at the temperature aforesaid, and laminating a predetermined number of said plies while wet.

11. In the manufacture of asbestos-cement products by dewatering a slurry of cement and asbestos fiber, the steps which comprise collecting the effluent from the dewatering of the slurry, recovering a thickened suspension of the solids therefrom, feeding steam into the effluent while undergoing recovery whereby to increase the temperature thereof to approximately 110 to 120° F., mixing said suspension with fresh quantities of cement and asbestos fiber whereby to form additional quantities of slurry and impart thereto a temperature of 110 to 120° F., forming wet plies by dewatering said slurry while the latter is maintained at the temperature aforesaid, and laminating a predetermined number of said plies while wet.

WILLIAM GERITY.